Oct. 19, 1943.  C. W. CLARK  2,331,889
STEADY REST FOR TESTING MACHINES
Filed March 30, 1942   2 Sheets-Sheet 1

INVENTOR.
CLYDE W. CLARK
BY Daniel G. Cullen
ATTORNEY.

Patented Oct. 19, 1943

2,331,889

UNITED STATES PATENT OFFICE 2,331,889

STEADY REST FOR TESTING MACHINES

Clyde W. Clark, Dearborn, Mich.

Application March 30, 1942, Serial No. 436,802

6 Claims. (Cl. 265—12)

This application relates to testing machines and particularly to testing machines of the type disclosed in my prior application Serial No. 384,083, filed March 19, 1941.

A testing machine of the type described in that application includes a C frame having a base, a post, and a head. Projecting upwardly from and movably mounted in the forward end of the base is an elevated screw or work support adapted to be raised or lowered, as by a hand wheel. Projecting downwardly from and floatingly mounted in the head, at its forward end, is a penetrator or point adapted to be moved downwardly by a load to penetrate work supported on the upper end of the support.

In the operation of the machine, the support is first elevated to establish contact between the work and the penetrator after which the load is released to pull down the penetrator and cause it to penetrate the work. Unless the work is held steady during the testing operation, particularly where the work is in the nature of small round wire or rod stock, the work is apt to roll around or the penetrator, which is mounted to float in the head of the frame, is apt to wobble; either gives an unsatisfactory reading.

The unsteadiness of the upper end of the support for the work is often due to wear at the lower end of the support where it is mounted in the base. Where the support is relatively short, slight wear at the lower end will not cause excessive unsteadiness and mislocation of its upper end; however, where the support is relatively long, even a slight amount of wear or mislocation at the lower end of the support will cause such a great amount of displacement and unsteadiness at the upper end of the support during the testing operation that it has heretofore not been considered practical to use long support machines for testing small round stock or work.

From my study of the problem, I concluded that a means could be devised for use with long support machines to enable such machines to be used for testing accurately even very small round stock, and in this application I disclose such a means, intended to be applied to a long support testing machine.

The means disclosed may be adjusted so as to occupy and be maintained in a desired location with respect to the penetrator, regardless of the original position of the upper end of the support, and the means may thus be considered as adjusted with respect to the penetrator, rather than with respect to the support. In addition, the means is so constructed that it serves to maintain steady the upper end of the support during the penetrating operation. The means also is so constructed that when once it is adjusted with respect to the penetrator, it will automatically adjust itself to varying sizes of work supported thereon.

It is further so constructed that it may be applied as an accessory to testing machines of the type disclosed in my application, above mentioned, Serial No. 384,083 to enable such machines, though having long supports, to be used for accurately testing small round stock. In addition, the means is so constructed that when it is not desired to test small round stock on the machine and thus when it is not desired to use the means, the means may be moved to an idle position so as not to interfere with the proper use of the machine for testing other kinds of stock.

The means of my invention will now be described upon reference to the appended drawings.

In these drawings.

Figure 1:
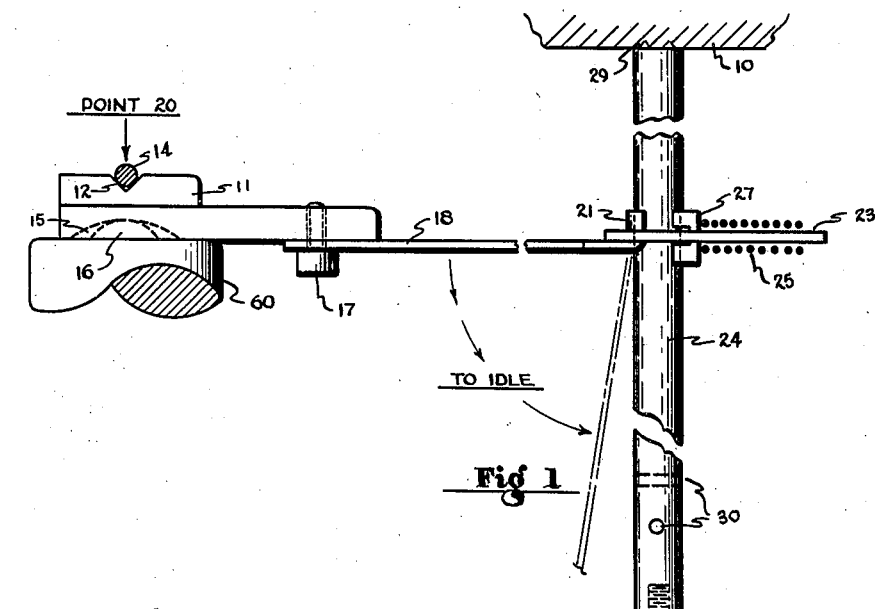
Fig. 1 is a side view of the means shown in place in a testing machine.
Figure 2:
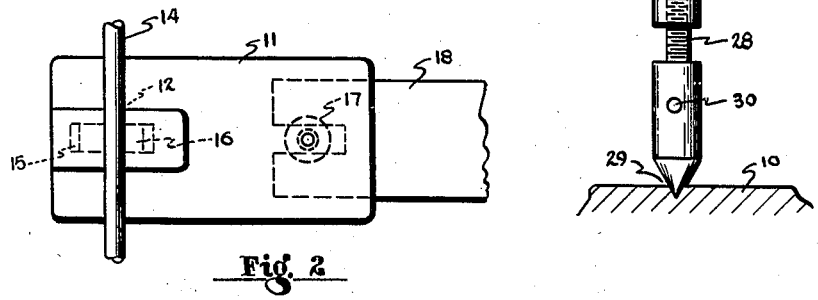
Figs. 2 and 3 are fragmentary plan views of the opposite ends of the means.
Figure 3:
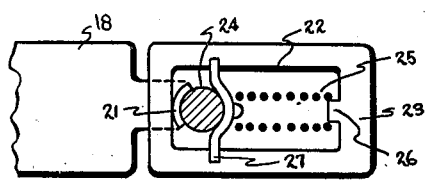
Figure 4:
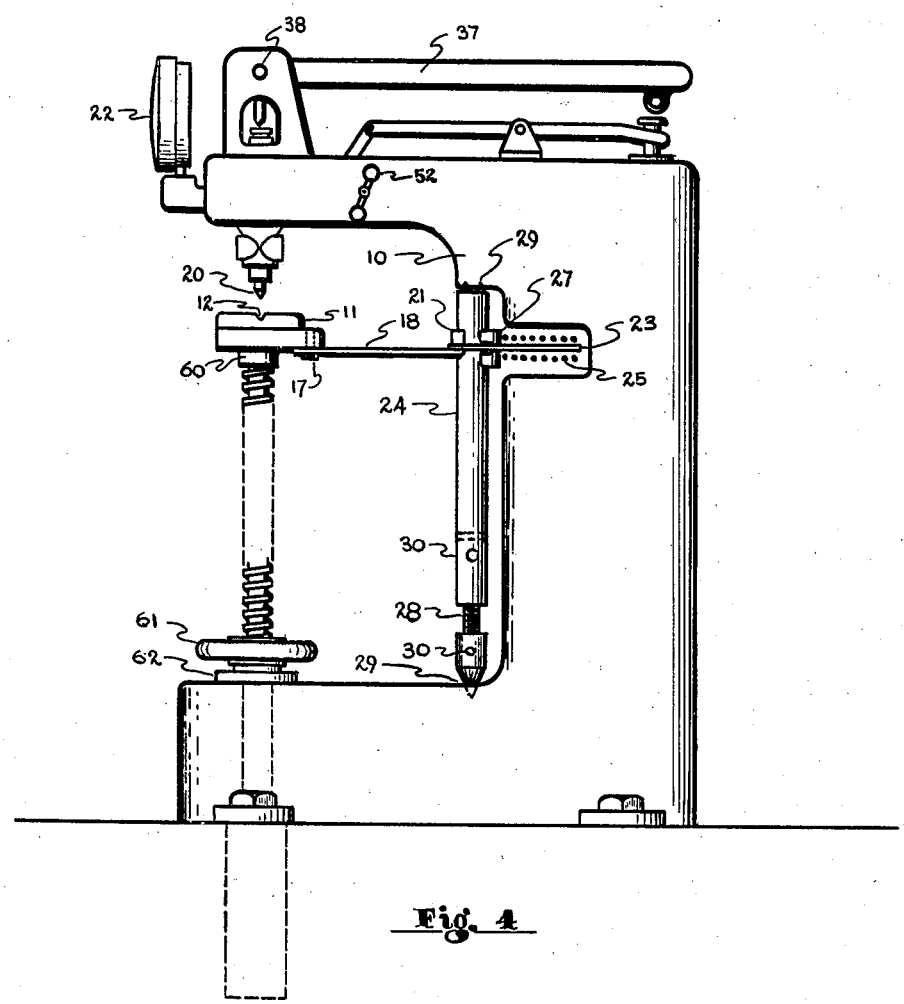
Fig. 4 shows the means in a complete hardness tester.

Fig. 4 shows a frame 10 having a screw or work support 60 manipulated by a hand wheel 61 rotating on a bushing 62. A handle 52 controls the lifting of a load, not shown, depending from a beam 37 pivoted at 38 and adapted, when dropped, to move down a penetrating point 20 whose degree of penetration is indicated at 22.

The means for steadying the upper end of the support and for properly locating a piece of small round stock being tested with respect to the penetrator 20 will now be described.

Such means consists of a work holder 11 having in its upper surface a V groove 12 in which is adapted to be supported the work, shown as a short piece of small round wire 14. The lower surface of the holder is formed with a keyway or slot 15 adapted to receive a key 16 formed on the upper end of the support 60, whereby relative shifting of the holder, and the work therein, with respect to the upper end of the support in the direction of the axis of the wire 14, is prevented, without, however preventing relative shifting of the holder and the support in the direction transverse of the axis of the wire 14.

An adjusting screw 17 forms an adjustable lock connection between the holder 11 and the slotted end of a steady rest strap 18, the adjustment between the holder and the strap 18 permitting the holder to move forward and back in the testing machine without requiring movement of the strap 18.

The end of the strap opposite the lock screw 17 is formed with a tongue 21 projecting into a cutout 22 of plate 23, in which cutout is disclosed a supporting rod 24, the tongue 21 thus forming a hinge connection between the strap 18 and rod 24 whereby the strap and the holder may occupy the work position shown or an idle position where the holder is remote from the support 60 and the holder and strap together hang down from plate 23, alongside the rod 24. Within the cutout 22 of plate 23 is a coiled compression spring 25, one of whose ends reacts at 26 against the plate 23 and the other of whose ends abuts a bearing plate 27 to form a resilient connection and grip between the strap 18 and the rod 24, whether the strap be in the working position shown or in the idle position.

The rod is formed of two portions threaded to each other as indicated at 28 and the upper and lower ends of the rod are formed with points 29; the portions of the rod may be rotated with respect to each other by means of wrenches or tools thrust into holes 30 of the rod portions so as to cause the rod to be located firmly in place in an open space in the post of the frame, with the upper and lower ends of the rod digging into the frame casting, the construction thus permitting the rod 24, and the parts supported thereby, to be firmly mounted in an existing machine when added as an accessory but, when once mounted, to be held firmly in place.

When a machine equipped with the means hereof is to be used for testing small round stock, the steady rest strap 18 and the holder 11 are swung upwardly from the idle position to the working position shown and the holder is rested on the upper end of the support 60 with its keyway 15 receiving the key 16. The support is raised as necessary to establish contact between the work 14 in the holder and the penetrator 20; the strap 18 and the holder will slide freely, as the upper end of the support rises along the rod 24, with no attention required from the user. Thereupon the lock 17 is loosened and the holder is shifted back and forward, as necessary, along the strap 18 until it is centered properly with respect to the penetrator, after which the previously loosened screw 17 is tightened up to lock the parts in the centered position. With the parts thus centered, a wire 14 in the holder 11 will cooperate with a downwardly moving point 20, moved down under load, so that neither the point, nor the work, nor the support will shift towards or from the rod 24 to create an inaccuracy in the test readings. Once the holder is centered properly with respect to the penetrator, further centering or adjustment of the holder will not be required, even though the size or diameter of the stock or work may vary. If the variations in work size are great, the variations in elevation of the upper end of the support 60 will consequently be great, and the steady rest strap 18 will automatically slide up and down on rod 24 to prevent any angular displacement of the holder with respect to the upper end of the support upon which the holder rests.

The force of spring 25, acting through the strap 18 and the holder 11, will maintain the work and the upper end of the support 60 steady during the testing operation.

It will be observed that the centering of the holder is with respect to the penetrator rather than with respect to the upper end of the support 60 and that the spring 25 not only helps maintain the holder so centered, but in addition, helps maintain steady the upper end of the support to which the holder is not centered, and with respect to which the holder is free to move in a direction transverse to the axis of the work.

Thus, regardless of the amount of wear at the lower end of the support, it is possible during a testing operation to have the work steady and the upper end of the support steady with respect to the penetrator and to maintain a centered relation between the work and the penetrator. This could not be done where the wear at the lower end of the support is sufficient, of itself or because of a magnification due to the length of the support, to cause the upper end of the support to shift during the testing operation or to make it difficult to center the work to the penetrator 20.

Now having described the steady rest and work centering attachment herein disclosed, reference should be had to the claims which follow for a determination of the inventions hereof.

I claim:

1. In a testing machine, an elongated work support movably mounted at its lower end in the base of the machine and adapted to support on its upper end, the work to be tested; means for elevating and lowering the support, a penetrator movably mounted in the head of the machine, means for moving the penetrator down towards the upper end of the support, a work holder movably mounted on the upper end of the support, the holder being movable with respect to the support in a horizontal direction while resting on the support, and a steady rest means secured to the frame of the machine for steadying the upper end of the support and the work holder thereon while work on the holder is being penetrated by the penetrator, and adjustable lock means intersecuring the holder and the steady rest means, and permitting the holder to be moved relative to the support and the steady rest means to a position wherein the work therein is properly located with respect to the penetrator; the lock means being manipulable to lock the holder there to the steady rest means, with the holder resting on the support, the steady rest means acting, through the holder on the support, to maintain the support and holder steady with respect to the frame.

2. In a testing machine, an elongated work support movably mounted at its lower end in the base of the machine and adapted to support, on its upper end, the work to be tested; means for elevating and lowering the support, a penetrator movably mounted in the head of the machine, means for moving the penetrator down towards the upper end of the support, a work holder movably mounted on the upper end of the support, the holder being movable with respect to the support in a horizontal direction while resting on the support, and a steady rest means secured to the frame of the machine for steadying the upper end of the support and the work holder thereon while work on the holder is being penetrated by the penetrator, and the adjustable lock means intersecuring the holder and the steady rest means, and permitting the holder to be moved relative to the support and the steady rest means to a position wherein the work therein is properly located with respect to the penetrator, the lock means being manipulable to lock the holder there to the steady rest means, with the holder resting on the support, the steady rest means acting, through the holder on the support, to maintain the support and holder steady with respect to the frame, and spring means for maintaining a spring pressure connection between the steady rest means and the frame.

3. In a testing machine, an elongated work support movably mounted at its lower end in the base of the machine and adapted to support, on its upper end, the work to be tested, means for elevating and lowering the support, a penetrator movably mounted in the head of the machine, means for moving the penetrator down towards the upper end of the support, a work holder movably mounted on the upper end of the support, the holder being movable with respect to the support in a horizontal direction while resting on the support, and a steady rest means secured to the frame of the machine for steadying the upper end of the support and the work holder thereon while work on the holder is being penetrated by the penetrator, and adjustable lock means intersecuring the holder and the steady rest means, and permitting the holder to be moved relative to the support and the steady rest means to a position wherein the work therein is properly located with respect to the penetrator, the lock means being manipulable to lock the holder there to the steady rest means, with the holder resting on the support, the steady rest means acting, through the holder on the support, to maintain the support and holder steady with respect to the frame, the steady rest means, the lock means, and the holder comprising a unitary assembly adapted to be applied to or removed from a frame as a unit.

4. In a testing machine, an elongated work support movably mounted at its lower end in the base of the machine and adapted to support, on its upper end, the work to be tested, means for elevating and lowering the support, a penetrator movably mounted in the head of the machine, means for moving the penetrator down towards the upper end of the support, a work holder movably mounted on the upper end of the support, the holder being movable with respect to the support in a horizontal direction while resting on the support, and a steady rest means secured to the frame of the machine for steadying the upper end of the support and the work holder thereon while work on the holder is being penetrated by the penetrator, and adjustable lock means intersecuring the holder and the steady rest means, and permitting the holder to be moved relative to the support and the steady rest means to a position wherein the work therein is properly located with respect to the penetrator, the lock means being manipulable to lock the holder there to the steady rest means, with the holder resting on the support, the steady rest means acting, through the holder on the support, to maintain the support and holder steady with respect to the frame, the steady rest means being slidably connected to the frame so as to move vertically with respect thereto automatically as the holder and support are moved vertically by manipulation.

5. In a testing machine, an elongated work support movably mounted at its lower end in the base of the machine and adapted to support, on its upper end, the work to be tested, means for elevating and lowering the support, a penetrator movably mounted in the head of the machine, means for moving the penetrator down towards the upper end of the support, a work holder movably mounted on the upper end of the support, the holder being movable with respect to the support in a horizontal direction while resting on the support, and a steady rest means secured to the frame of the machine for steadying the upper end of the support and the work holder thereon while work on the holder is being penetrated by the penetrator, and adjustable lock means intersecuring the holder and the steady rest means, and permitting the holder to be moved relative to the support and the steady rest means to a position wherein the work therein is properly located with respect to the penetrator, the lock means being manipulable to lock the holder there to the steady rest means, with the holder resting on the support, the steady rest means acting, through the holder on the support, to maintain the support and holder steady with respect to the frame, the steady rest means, the lock means, and the holder comprising a unitary assembly adapted to be applied to or removed from a frame as a unit, and mounted on the frame in such a manner that when applied to a frame, the assembly can be moved to an idle position where the holder is remote from and free of the support, though secured to the frame, in idle position.

6. In a testing machine, an elongated work support movably mounted at its lower end in the base of the machine and adapted to support, on its upper end, the work to be tested, means for elevating and lowering the support, a penetrator movably mounted in the head of the machine, means for moving the penetrator down towards the upper end of the support, a work holder movably mounted on the upper end of the support, the holder being movable with respect to the support in a horizontal direction while resting on the support, and a steady rest means secured to the frame of the machine for steadying the upper end of the support and the work holder thereon while work on the holder is being penetrated by the penetrator, and adjustable lock means intersecuring the holder and the steady rest means, and permitting the holder to be moved relative to the support and the steady rest means to a position wherein the work therein is properly located with respect to the penetrator, the lock means being manipulable to lock the holder there to the steady rest means, with the holder resting on the support, the steady rest means acting, through the holder on the support, to maintain the support and holder steady with respect to the frame, the steady rest means being slidably connected to the frame so as to move vertically with respect thereto automatically as the holder and support are moved vertically by manipulation, the steady rest means, the lock means, and the holder comprising a unitary assembly adapted to be applied to or removed from a frame as a unit.

CLYDE W. CLARK.